Nov. 3, 1959
E. J. DOWER
2,910,871
LIQUID DENSITY RECORDER
Filed June 27, 1955
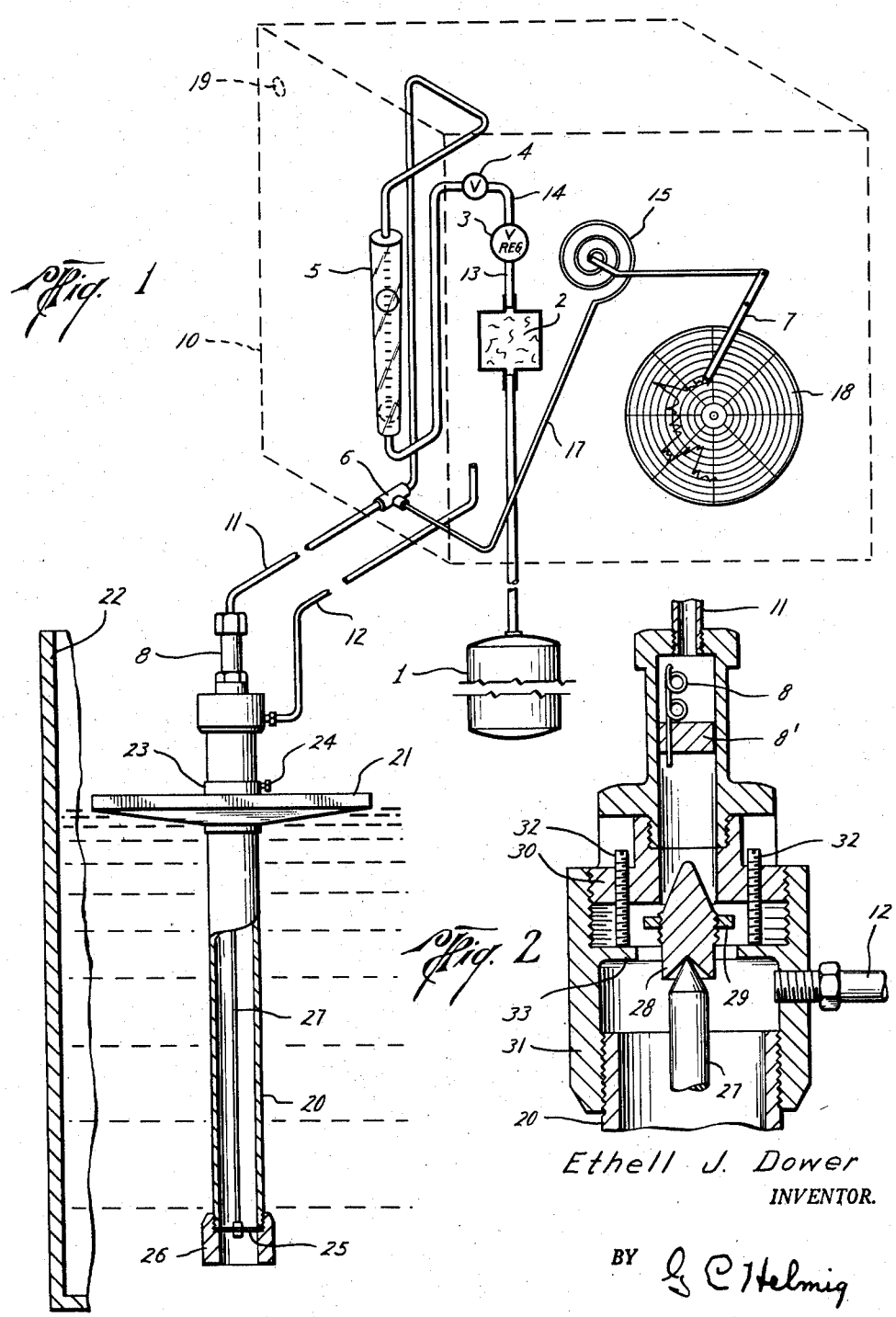
Ethell J. Dower
INVENTOR.
BY *J. C. Helmig*
ATTORNEY United States Patent Office 2,910,871
Patented Nov. 3, 1959

2,910,871

LIQUID DENSITY RECORDER

Ethell J. Dower, San Antonio, Tex., assignor to Warren Automatic Tool Company, Houston, Tex., a corporation of Texas Application June 27, 1955, Serial No. 518,185

4 Claims. (Cl. 73—438)

During the operation of drilling a well in the hope of striking oil or gas, it is customary to circulate a liquid mud solution of selected composition down to and back from the drilling level to serve various well known purposes, and as an incident to that practice advantage can be taken to determine characteristics of the earth formations at each level as drilling progresses, and without stopping drilling operation. For example, the returning drilling mud can be analyzed from time to time for determining content dilution by gas, oil, water or the like. Thus if the specific gravity of the entering mud is of a known value at any instant and whether maintained constant or changed from time to time, a calculation of circulation time will enable measurement of the specific gravity of the same mud as it leaves the well hole for comparison of density change between entrance and return of a given sample. The extent of change, if any, affords to the driller a showing of depth occurrences, so that desired corrections can be made in mud composition or in the drilling rate and preparations can be made for anticipated occurrences, such as the penetration of a pay formation when a warning is received by an abnormal or marked density decrease due to the entrainment in the mud of increasing quantities of oil or gas.

A continuous check or density of the flowing mud with automatic instrumentation requiring no manual effort or involved operations, and preferably giving a running record, will not only enable immediate knowledge at all times of well conditions for guidance of preparatory action as called for in the maintenance of proper control of the work but will also preserve a reviewable history showing the conditions encountered throughout the drilling operation, the times of occurrences, and the measures taken in the light thereof. To provide such equipment is one of the objects of the present invention.

A further object of the invention is to provide improved testing apparatus for easily and instantly measuring liquid density and changes thereof, and which is characterized by its simplicity, reliability, and low cost with respect both to manufacture and use.

Another object of the invention is to provide a liquid density indicating system utilizing a small supply of air or other suitable fluid under pressure controllably fed in regulated volume to a small escape vent which is constantly open but subject to variation in pressure leak-down proportionally and in direct response to gravity weight and variations in weight of a given head of liquid so as to afford a measure of mud content.

It is also an object of the invention to provide an improved air pressure recording system having a liquid density controlled pressure air escape unit which is individually separate from a feed flow control and recording unit with hose connection between the units accommodating their remote positioning, and which pressure air escape unit includes a vent throttle connected for operation in response to the position of a density sensing movable wall, float suspended in the liquid whose density is to be measured at a given distance below the liquid to insure response to the weight of a constant height liquid column or head regardless of liquid level change, and which renders the unit ideally adapted for submersion in a moving liquid stream such as a mud flow return vat or channel through which the well mud continuously flows during a drilling operation.

Other objects and advantages of the invention will become apparent during the course of the following specification having reference to the accompanying drawing, wherein Fig. 1 is a view of an installation with the control and recording unit shown somewhat diagrammatically and in perspective and the leak-down unit shown in elevation with parts in section, and Fig. 2 is an enlarged fragmentary, vertical section of the constantly open leak-down throttle.

In the preferred embodiment of the invention selected for illustration, there is utilized a co-operative arrangement of parts, certain of which are well known, standard items of commerce and are shown generally without burdening the disclosure with unnecessary detail. Essentially the parts are grouped into two easily handled units. This is especially advantageous for installation at a well drilling location, since the measuring unit can be placed at the derrick platform in view of the superintending attendant and the other unit can be placed in the mud stream leading either to or from the well hole. Use of two sets of equipment for measuring both entering mud and returning mud will facilitate comparisions, but generally one set of measuring equipment for recording density variations of returning mud will in itself give sufficient significant information of whether dilution by lighter fluids is occurring in the well bore, and the extent of dilution. Measurement is effected by use of a conventional pressure recording device responsive to pressure level in a passage to which pressure air is supplied at a constant rate of flow and from which controlled leakage occurs in relation to liquid density.

A complete air flow circuit, as shown in Fig. 1, includes in series connection an air pressure source 1, a filter 2, a pressure regulator 3, an air flow metering orifice or adjustable needle valve 4, a flow gauge 5, a take-off connector 6 for a pressure recorder 7, a snubber orifice 8, a leak-down throttle valve and a vented casing 10. Grouped as a compact assembly unit and protectively housed within the casing 10 are the several elements 2 to 7, inclusive, and formed as parts of a second subassembly unit are the snubber 8 and the leak-down valve. Supply and exhaust flow connections, such as a pair of flexible hoses 11 and 12, extend between the two units which are variously spaced apart to meet installation requirements. Hose lengths of as much as two hundred feet are feasible, since the results obtained are relatively free of adverse effects from air flow resistance.

Pressure air may be supplied from an air compressor storage tank usually available at a drilling rig, but an air bottle containing a supply of clean dry air under pressure will serve the system nicely and will aid in minimizing corrosion and blocking of small passages by keeping down moisture and dirt entrainment in the actuating fluid. It can be here stated that the system is designed so that flow discharge is extremely small and on the order of about two-tenths of a cubic foot per hour, and a handy size air bottle will contain a supply of air for about thirty days of continuous operation. As a safety factor, a suitable dirt and moisture removing filter 2 is employed to receive pressure air from the source 1 and is preferably included as a part of the package unit encased within the housing 10.

Filtered air goes through a short conduit 13 to a pressure regulator 3 and is automatically valved or reduced down to constant pressure of about fifty-five pounds per square inch within the conduit or passage 14 leading from the regulator. A satisfactory standard regulator suitable for the purpose is one having a spring opened valve which is seated by the movement of a flexible diaphragm exposed to pressure within the outgoing conduit passage 14. Such regulators usually have provision for varying the setting of the spring for adjusting pressure at which the valve opens and closes. The figure of fifty-five pounds per square inch constant pressure is given by way of example for use with well mud testing equipment here being described. This constant pressure air passes through a flow control metering device 4, preferably in the form of an adjustable needle valve mounted within the passage 14 and also protectively contained within the housing 10 to preclude unauthorized tampering with its adjusted setting, which, for the illustrated example, will permit the air under constant pressure to flow beyond the valve 4 at a rate of two-tenths cubic foot per hour.

For a convenient check on the restrictive action of the needle valve setting, thereby may optionally be installed in tandem connection in the line 14 with the needle valve 4 and in line with a viewing window in the side wall of the housing 10, a velocity flow gauge 5 of a well known type wherein a sight glass has an internal vertical bore of increasing diameter upwardly and contains a gravity ball for suspension in the air stream at heights proportional to flow velocity and whose raised position can be read on a graduated scale carried by the wall of the glass tube. Also housed within the casing 10 is the gauge or pressure indicator 7 having a Bourdon tube actuator 15 connected by a conduit 17 with the take-off or T fitting 6 in the flow passage beyond the gauge 5. Expansion and contraction of the Bourdon tube 15 is in response to air pressure changes in the passage and shifts the position of the indicator stylus to mark pressures on a clock-operated graph sheet 18 for giving a continuous record of pressure levels. Special graph paper will be employed to plot time and pressure, but the pressure will be in readings conveniently of from eight to twenty pounds per gallon as representative of the practical range of mud concentration. The chart will be conveniently located for observation at all times through a sight wall window in the casing 10.

Beyond the T fitting 6, the metered flow passage will terminate at the housing wall in a coupling for detachable connection with a length of flexible hose 11 by which the flow passage is extended to an inlet on the leak-down unit. The small amount of air continually leaking past the throttle valve is exhausted through the flexible return hose 12 leading back to the interior of the casing 10 for discharge thereinto and free escape through a suitable vent opening 19. By flowing the clean dry air through the casing, dirt and moisture around the encased parts are minimized, and additionally there is insured a free and clear exhaust path, which would not be the case if the exhaust was directly open at the valve unit which rides in the liquid mud and is subject to splashings of the mud, which tends to encrust the unit and would be likely to clog an exhaust opening from the inside of the unit.

The valve unit comprises an outer supporting housing affording a sealed enclosure and being conveniently formed of a metal tube 20 vertically suspended by a plate-like float 21 within the mud, which is channeled to flow through a container or vat 22 and whose level may change from time to time. Regardless of level changes, the projection or submergence of the lower end of the tube 20 below the liquid surface remains the same at all times. To enable submergence distance to be adjusted and initially set up for given operating conditions, the float 21, which may comprise a square of balsa wood protectively sheathed within a thin metal envelope, is fixed to a central hub or sleeve 23 slidably fitted on the tube 20 and provided with one or more set screws 24 for clamping the sleeve 23 with the tube 20 at any desired position. The underside of the float plate 21 is preferably convex or in the shape of an inverted pyramid, so that its surface inclines upwardly and outwardly to prevent entrapment and pocketing of air or gas which may bubble out from the liquid. Elimination of any gas entrapment under the float will better insure uniformity in depth of the lower end of the tube below the liquid surface. At its lower end the tube 20 is closed by a movable wall such as a flexible diaphragm 25 of spring metal, synthetic rubber, or the like and whose rim is clamped between the bottom edge of the tube 20 and an internal shoulder at the upper end of a thick-walled protective guard ring 26 threadedly secured on the lower end of the tube 20. Centrally secured to the diaphragm 25 is a motion transmitting stem or rod 27 which extends upwardly within the tube 20 for controlling the extent of opening of the leak-down valve at the top of the tube with variable deflection of the diaphragm 25 in response to instant weight of the constant head of liquid between the diaphragm and liquid surface.

The design of the float suspended unit is carefully engineered so that reference to a constant liquid head acting on the diaphragm 25 is substantially correct, even though a wide density range is under consideration. A square of balsa wood of fourteen inches in both directions does not appreciably add to the weight of the tube assembly which is about two pounds and the float area and unit buoyancy in relation to the weight of displaced liquid minimizes differences in the height at which the diaphragm rides at the extremes of density range so as not significantly to affect gauge accuracy.

Referring to the detail structure of the valve as seen in Fig. 2, a pointed or tapered tip at the top of the rod 27 is received within a tapered bore in the under side of a short length valve stem 28 and whose taper is of a greater angle than that of the tip on the riser stem 27 to afford a loose swivel support. Adjustably threaded on the stem 28 is a ring or washer 29 and which can be set in position with reference to the underside of a closure fitting 30 adjustably screw threaded in a tubular head 31 at the top of the tube 20. The relative positions of adjustment of the valve elements 29 and 30 are such that they seldom come into snug seating contact, but are almost always open or cracked. That is to say, they are normally spaced apart for constant leakage in gauging the usual range of densities, but occasionally there may be an abnormal density increase, as might occur for example, when a sudden large drop in density is immediately followed by a rapid upsurge beyond normal density intended to be maintained, as to raise the diaphragm 25 to the upper limit permitted by seating contact of the valve surfaces in completely sealing off air escape. In this connection, it is to be noted that the line pattern of density changes shown on the graph disk 18 in the drawing is somewhat exaggerated to emphasize sharp and wide variations, whereas it is to be expected generally that most changes will be moderate and less pronounced.

To centralize the valve ring 29, the upper end of the stem 28 projects within a central bore in the closure fitting 30 and acts as a guide. It may be loosely slidably fitted to the wall of the bore, and if desired, one or both of the guide surfaces may be fluted to insure an open passageway. The guide bearing and the swivel mounting for the valve stem 28 will tend to maintain the adjoining faces of the valve disk 29 and the valve ring 30 in parallelism without requiring extreme manufacturing accuracy in the connection between the valve disk, its operating diaphragm 25, and the motion transmitting stem 27. To fix the adjusted setting of the valve ring 30 on its screw threaded mounting, it carries one or more downwardly projecting set screws 32 arranged to abut at their lower ends with an internal flange 33 on the end fitting 31. By turning down the set screws and putting them under compression, the adjustable screw threads between the fittings 30 and 31 will tend to be jammed into a tight frictional engagement to resist displacement.

To stabilize against temporary fluctuations in pressure readings and to snub sudden change in the rate of release of pressure air, as might tend to occur upon valve flutter due to violent turbulence in the liquid stream, and also to prevent a quick outrush of pressure air and resultant damage to the relatively delicate pressure recording mechanism should submergence of the valve unit be ended for any reason, as, for example, if a workman lifts the valve unit bodily out of the flowing mud, there is incorporated in the air flow passage immediately adjacent the valve a flow restriction, previously referred to as a metering device 8. This restriction includes an orifice plug 8' fitted to and closing an upstanding tube carried by the end fitting 30 and providing the detachable coupling for the hose 11. The plug 8' has a small port therethrough for checking the rate of flow to a predetermined value, and the orifice passage is extended upwardly above the top surface of the plug by the addition of a helical coil of small tubing to bring the entrance to the orifice restriction at a point high enough that a trap is afforded below it for the dropping and retention of fine dirt particles carried in the air toward the valve.

In the operation of the system, the movable wall or diaphragm 25 is suspended by the float 21 at a fixed distance below the liquid surface and the given liquid column height or head acts on the diaphragm to deflect it in proportion to the weight of the liquid. This fixed head remains the same regardless of changes in the height of the liquid level within the container, and the single weight sensing wall is the sole agency for controlling the escape of pressure air in direct relation to the weight. The heavier the liquid, the more the flow is throttled, which means that in the absence of an unusual entrainment of density lightening materials the escape of pressure air is at its minimum, so that a given small supply of air will last for a long time. Replenishment flow is controlled by the fixed setting of the needle valve 4 and the constant pressure ahead of the needle valve, so that the pressure within the passage between the needle valve and the leak valve will be directly related to liquid density and so recorded at the pressure indicator. Should liquid density decrease, then the release of pressure air will increase accordingly. The variations are readily made known to enable better control of the drilling operations and the taking of necessary corrective measures as may be called for, and the entire record is available for later study.

While the foregoing description has dealt only with the preferred embodiment of the invention, it is to be understood that such modifications may be made as come within the scope of the appended claims.

What is claimed is:

1. Apparatus for measuring the density of a liquid whose level at the point of measurement varies from time to time, including a device having a density responsive wall to be submerged in the liquid, buoyant means fixed to said device in vertically spaced relation above said density responsive wall and adapted to be positioned in the liquid and to follow the rise and fall of liquid level changes and thereby suspend said density responsive wall at a constant depth of submergence for exposure to a given liquid column height regardless of liquid level variation, a passage having means to feed pressure fluid thereto at a constant rate and having a pressure bleed-down outlet, an outlet throttle shiftable to vary the rate of pressure bleed-down and operatively connected with said wall for actuation with wall responses to liquid density and means to gauge passage fluid pressure as an indication of liquid density.

2. For use with a liquid density gauging mechanism wherein a variable leakage valve responds to liquid density characteristics to leak pressure fluid from a passage in relation to the relative weights of the liquid to be gauged, a passage controlled by said valve, orifice metering means to check pressure fluid flow into said passage at a predetermined flow rate, a pressure regulator responsive to fluid pressure ahead of said orifice metering means to maintain said flow pressure at constant value, a pressure indicator connected with said passage to register fluid pressure therein between said orifice metering means and a valve controlled portion of the passage, and a plug positioned in said passage adjacent the valve controlled portion thereof, said plug having a small flow orifice therethrough and a standpipe communicating with the plug orifice and projecting upwardly within the passage to provide a dirt trap below its upwardly projected entry end.

3. In a liquid density measuring mechanism, a pair of co-operating units one of which includes a pressure regulator having an inlet for fluid under pressure and an outlet passage for fluid under regulated constant pressure, a constant flow control in the passage behind the regulator, a gauge to measure fluid pressure behind said control and a vented casing protectively enclosing the regulator, the control and the gauge, the other of said co-operating units including a tube to be projected at its lower end into the liquid whose density is to be measured, a float fixed to the tube to suspend its lower end at a fixed distance below the level of the liquid, a density sensing movable wall closing the bottom of the tube, a valve housing on the tube having pressure fluid inlet and outlet connections, a normally open valve within said housing controlling communication between said inlet and outlet connections and a direct connection between the valve and said movable wall for movement of the valve in direct proportion with wall movement in proportionately varying the valve opening and flexible hose connections joining the fluid pressure outlet passage of the first unit with the inlet connection of the second mentioned unit and said outlet connection with the interior of said vented casing.

4. In liquid density measuring apparatus of the character described, a passage having means to supply pressure air thereto at a constant rate, means to indicate air pressure within the passage, a variable opening leak-down valve controlling outflow of pressure air from the passage, a liquid density sensing device operatively connected with the valve to vary its opening in response to changes in liquid density and arranged to be submerged in the liquid whose density is to be measured, and a liquid supported float device suspending said sensing device submerged at a given distance below the liquid level for exposure at all times to a constant liquid head and comprising a buoyant plate whose underside is convex and inclines upwardly and outwardly from its central region.

References Cited in the file of this patent

UNITED STATES PATENTS

| 1,631,909 | Badin | June 7, 1927 |
| 1,861,886 | Slough | June 7, 1932 |
| 2,345,180 | Cook | Mar. 28, 1944 |
| 2,441,044 | Tate | May 4, 1948 |
| 2,490,375 | Rupley | Dec. 6, 1949 |
| 2,592,569 | Henderson | Apr. 15, 1952 |
| 2,609,681 | Bielstein | Sept. 9, 1952 |

FOREIGN PATENTS

| 234,515 | Great Britain | Feb. 4, 1926 |

OTHER REFERENCES

American Machinist, "Essentials of Air Gaging," January 2, 1947, pages 69–72.